United States Patent [19]

Suzuki et al.

[11] Patent Number: 5,083,496
[45] Date of Patent: Jan. 28, 1992

[54] SEAL UNIT FOR BRAKE BOOSTER

[75] Inventors: Haruo Suzuki; Atushi Satoh, both of Saitama, Japan

[73] Assignee: Jidosha Kiki Co., Ltd., Tokyo, Japan

[21] Appl. No.: 542,748

[22] Filed: Jun. 22, 1990

[30] Foreign Application Priority Data

Aug. 11, 1989 [JP] Japan .................... 1-94911[U]

[51] Int. Cl.$^5$ .................................... F15B 9/10
[52] U.S. Cl. ............................ 91/376 R; 91/369.2
[58] Field of Search ............ 91/369.1, 369.2, 376 R; 92/48, 98 R, 98 D, 169.1

[56] References Cited

U.S. PATENT DOCUMENTS

| 2,549,818 | 4/1951 | Joy ........................... 92/168 |
| 3,958,497 | 5/1976 | Gardner et al. ............... 92/48 |
| 4,292,887 | 10/1981 | Ohta et al. ............... 92/98 D X |
| 4,377,069 | 3/1983 | Kobayashi ............... 92/369.2 X |
| 4,512,237 | 4/1985 | Endoh et al. ............... 91/369 |
| 4,534,270 | 8/1985 | Nishii ....................... 92/98 D X |
| 4,619,185 | 10/1986 | Mori et al. ................... 91/369 |
| 4,793,242 | 12/1988 | Kobayashi ................... 92/168 |
| 4,881,452 | 11/1989 | Newhouse ....................... 92/48 |
| 4,898,081 | 2/1990 | Fecher ......................... 92/165 R |
| 4,996,904 | 3/1991 | Ohki et al. ................. 92/98 R X |

FOREIGN PATENT DOCUMENTS

| 44-9770 | 5/1969 | Japan. |
| 53-23913 | 7/1978 | Japan. |
| 57-46206 | 12/1982 | Japan. |
| 60-154952 | 8/1985 | Japan. |

Primary Examiner—Edward K. Look
Assistant Examiner—John Ryznic
Attorney, Agent, or Firm—Flynn, Thiel, Boutell & Tanis

[57] ABSTRACT

A seal unit for a brake booster such as of a tandem type including a centerplate disposed within a shell is disclosed. Annular seal means maintains a hermetic seal between the centerplate and a valve body. According to the invention, the annular seal means is formed with a passage which provides a communication between the inner and the outer periphery thereof. This allows a communication between the inner and the outer periphery of the annular seal means to be maintained by the passage formed therein in the event the opening of a constant pressure passage (or variable pressure passage) formed in the valve body is closed by the annular seal means. This allows a spacing between the annular seal means and a power piston or pistons mounted on the valve body to be reduced, contributing to reducing the overall length of the brake booster.

8 Claims, 2 Drawing Sheets

SEAL UNIT FOR BRAKE BOOSTER

FIELD OF THE INVENTION

The invention relates to a brake booster, and more particularly, to a seal unit for brake booster of the type such as a brake booster of tandem type in which a centerplate is disposed within a shell.

DESCRIPTION OF THE PRIOR ART

A brake booster of tandem type generally comprises a centerplate which is disposed within a shell to divide its interior into a front and a rear chamber, a valve body slidably extending through the centerplate, annular seal means for hermetically sealing between the centerplate and the valve body, a front and a rear power piston connected to the valve body within the respective chambers divided by the centerplate, diaphragms applied to the back surface of the respective power pistons to divide each chamber into a constant and a variable pressure chamber, and a constant pressure passage providing a communication between the individual constant pressure chambers, and a variable pressure passage providing a communication between the individual variable pressure chambers (See Japanese Patent Publications No. 9,770/1969 and No. 23,913/1978 and Japanese Laid-Open Patent Application No. 154,952/1985).

The annular seal means which maintains a hermetic seal between the centerplate and the valve body normally comprises an annular seal member formed of rubber, and a bearing mounted on the seal member for guiding the valve body for sliding movement. The outer periphery of the seal member is secured to the inner peripheral edge of an opening formed to extend through the centerplate, and the inner periphery of the seal member is disposed in sliding contact with the outer peripheral surface of the valve body, thus maintaining a hermetic seal between the valve body and the centerplate.

When the constant pressure passage is formed within the valve body, one end of the passage is made to communicate with one of the constant pressure chambers, which is located forwardly of the front power piston, while the other end of the passage must be made to communicate with the constant pressure chamber located between the centerplate and the rear power piston. The other end opens into the valve body between the centerplate and the rear power piston. In addition, the opening formed at the other end of the constant pressure passage is formed adjacent to the rear power piston so that the opening cannot be covered and sealed by the annular seal means when the valve body and the rear power piston have advanced to the end of their forward stroke.

On the other hand, when the variable pressure passage is formed in the valve body, one end of the passage is made to communicate with one of the variable pressure chambers, which is located rearward of the rear power piston, while the other end must be made to communicate with the variable pressure chamber defined between the centerplate and the front power piston. The other end opens into the valve body between the centerplate and the front power piston. In addition, the opening formed at the other end of the variable pressure passage is formed adjacent to the front power piston so that the opening cannot be covered and sealed by annular seal means in the inoperative condition where the valve body and the rear power piston have retracted to the end of their rearward stroke.

It will be appreciated from the foregoing description of the conventional arrangement that when connecting the respective power pistons to the valve body on the opposite sides of the annular seal member, there is a need for the provision that the annular seal means does not close the opening formed in the constant pressure passage or in the variable pressure passage. This means that the overall length of the valve body and hence the brake booster must be increased.

SUMMARY OF THE INVENTION

In view of the foregoing, in a brake booster such as of a tandem type which includes a centerplate disposed within a shell and annular seal means for maintaining a hermetic seal between the centerplate and a valve body, in accordance with the invention, a passage is formed in the annular seal means which provides a communication between its inner and its outer periphery.

With this arrangement, the passage formed in the annular seal means maintains a communication between the inner and the outer periphery thereof even if the opening formed in the constant or the variable pressure passage moves close to and closed by the annular seal means at the end of the forward or rearward stroke of movement of the valve body and the power pistons. Accordingly, a communication between the opening of the constant pressure passage and the constant pressure chamber or a communication between the opening formed in the variable pressure passage and the variable pressure chamber can be maintained. This means that the spacing between the power pistons can be reduced when they are mounted on the valve body, thus allowing a reduction in the overall length of the brake booster.

Above and other objects, features and advantages of the invention will become apparent from the following description of embodiments thereof with reference to the drawings.

DETAILED DESCRIPTION OF EMBODIMENTS

Figure 1:
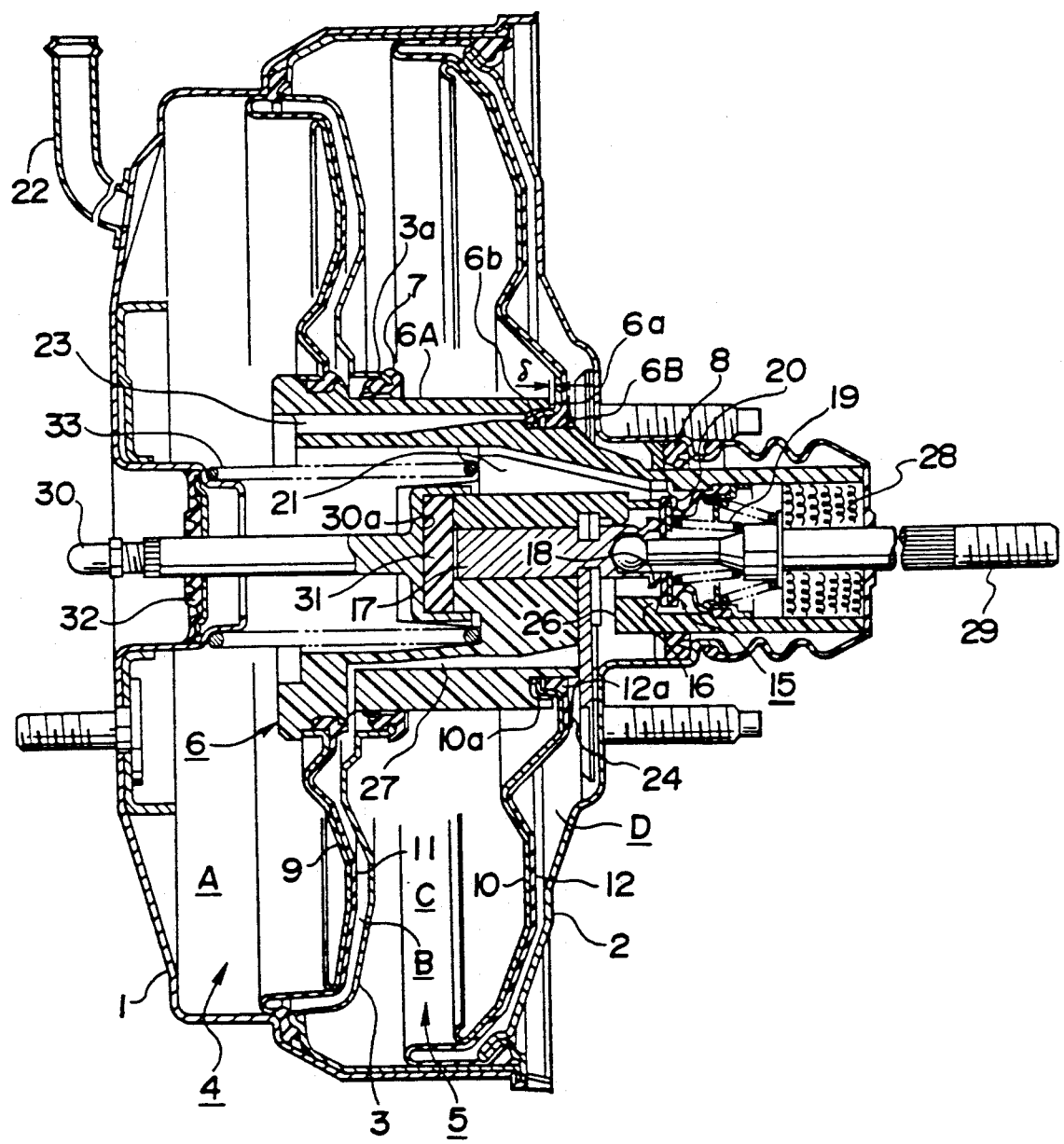
FIG. 1 is a cross section, partly in elevation, of one embodiment of the invention.

Referring to the drawings, several embodiments of the invention will now be described. In FIG. 1, an enclosed vessel is defined by a front shell 1 and a rear shell 2, and a centerplate 3 is disposed at the boundary therebetween to devide the interior of the vessel into a front chamber 4 and a rear chamber 5. A substantially cylindrical valve body 6 slidably extends through axial portions of the rear shell 2 and the centerplate 3, with annular seal means, 7, 8 maintaining a hermetic seal therebetween.

Connected to the valve body 6 are a front power piston 9 and a rear power piston 10, which are disposed in the front chamber 4 and the rear chamber 5, respectively. A front diaphragm 11 and a rear diaphragm 12 are applied to the back surfaces of the power pistons 9 and 10, respectively, thus defining a constant pressure chamber A and a variable pressure chamber B across the front diaphragm 11 and defining a constant pressure chamber C and a variable pressure chamber D across the rear diaphragm 12.

A valve mechanism 15 operates to switch a fluid circuit formed between the pair of constant pressure chambers A, C and the pair of variable pressure chambers B, D, and is disposed within the valve body 6. Specifically, the valve mechanism 15 comprises an annular, first valve seat 16 formed on the valve body 6, an annular, second valve seat 18 formed on the right end of a valve plunger 17 which is disposed to be slidable within the valve body 6, at a location radially inward of the valve seat 16, and a valve element 20 which is urged by a spring 19 to be seated upon either valve seat 16, 18 from right, as viewed in FIG. 1.

A space located radially outward of an annular seal defined by the contact between the first valve seat 16 and the valve element 20 communicates with the constant pressure chamber A through an axially extending constant pressure passage 21 which is formed in the valve body 6. The chamber A communicates with an intake manifold, not shown, through a tubing 22 mounted on the front shell 1 which serves introducing a negative pressure.

The constant pressure chamber A communicates with the constant pressure chamber C through an axially extending, second constant pressure passage 23 which is formed in the valve body 6. The right end of the passage 23 communicates with an annular groove 6b formed in a stepped end face 6a defined between a larger diameter portion 6A and an intermediate diameter portion 6B of the valve body 6, and the axial portion of the rear power piston 10 is formed with a forwardly projecting, stepped cylindrical portion 10a, with the free end thereof having a reduced diameter being fitted inside the annular groove 6b and in abutment against the bottom of the annular groove 6b.

Accordingly, the passage 23 communicates with the annular groove 6b on the outside of the cylindrical portion 10a, and normally communicates with the constant pressure chamber C through an opening formed adjacent to the rear power piston 10, namely, through a clearance δ defined between the stepped end face 6a of the valve body 6 and the rear power piston 10.

A bead 12a extending around the inner periphery of the rear diaphragm 12 is fitted inside the stepped cylindrical portion 10a, thus preventing the passage 23 from communicating with the variable pressure chamber D. The disengagement of the bead 12a from inside the stepped cylindrical portion 10a is prevented by a retainer 24 which is fitted around the outer periphery of the valve body 6.

On the other hand, a space located radially inward of the seal defined by the contact between the first valve seat 16 and the valve element 20 and which is located radially outward of an annular seal defined by the contact between the second valve seat 18 and the valve element 20, that is, a space located intermediate the both annular seals, communicates with the variable pressure chamber D through a radially extending variable pressure passage 26 which is formed in the valve body 6, and the chamber D further communicates with the variable pressure chamber B through another variable pressure passage 27 formed in the valve body 6. The opening of the variable pressure passage 27 into the variable pressure chamber B is formed at a location adjacent to the front diaphragm 11 which is applied to the back surface of the front power piston 9.

Finally, a space located radially inward of the inner annular seal defined by the contact between the second valve seat 18 and the valve element 20 communicates with the atmosphere through a filter 28.

The right end of the valve plunger 17 which is slidably disposed within the valve body 6 is connected to an input shaft 29 which is mechanically coupled to a brake pedal, not shown, while the left end of the valve plunger 17 is disposed in opposing relationship with the right end face of a reaction disc 31 received in a recess 30a which is formed in one end of a push rod 30. The left end of the push rod 30 slidably extends through the front shell 1 to the outside thereof, with a seal member 32 disposed therearound, for connection with a piston of a master cylinder, not shown. The valve body 6 is normally urged to its inoperative position shown by a return spring 33.

Figure 2:
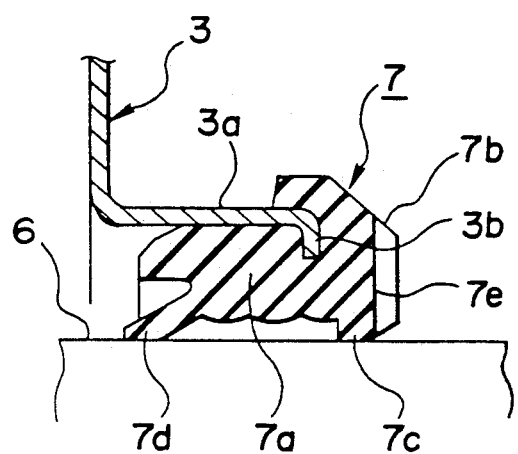
FIG. 2 is a cross section, to an enlarged scale, of part shown in FIG. 1.

As shown in FIG. 2, the inner periphery of the centerplate 3 on which the annular seal means 7 is disposed has a cylindrical extension 3a of a given length extending rearward, with its rear end folded radially inward to define a fold 3b around which the annular seal means 7 is mounted.

In the present embodiment, the annular seal means 7 comprises a single annular seal member of rubber. The annular seal means 7 comprises a body 7a which is a press fit into the cylindrical portion 3a of the centerplate 3, an ear 7b extending from the body 7a and abutting against the rear side of the fold 3b, a first seal 7c extending radially inward from the ear 7b and disposed in sliding contact with the outer periphery of the valve body 6, and a second seal 7d extending radially inward and obliquely forward from the front end of the body 7a and disposed in sliding contact with the outer periphery of the valve body 6. In the present embodiment, a plurality of slits 7e are formed in the rear end face of the annular seal means 7 to provide passages which provide a communication between the inner and the outer periphery thereof.

With the described arrangement, when a brake pedal, not shown, is depressed to drive the input shaft 29 and the valve plunger 17 to the left, the valve element 20 becomes seated upon the first valve seat 16 formed on the valve body 6, thus interrupting the communication between the variable pressure chambers B and D and the constant pressure chambers A and C while moving the valve element 20 away from the second valve seat 18 formed on the valve plunger 17, thus allowing the variable pressure chambers B and D to communicate with the atmosphere. Consequently, the atmosphere is supplied into the variable pressure chambers B and D, and the pressure differentials across the respective power pistons 9 and 10 are effective to drive the power pistons 9, 10 and the valve body 6 forward against the resilience of the return spring 33 to provide a braking action generally in the same manner as a conventional brake booster of a tandem type.

When the power pistons 9, 10 and the valve body 6 reach the end of their forward stroke, and the front surface of the rear power piston 10 moves close to or abuts against the rear end face of the annular seal means 7, the plurality of slits 7e formed in the rear end face thereof allow a communication to be maintained between the constant pressure passage 23 and the constant pressure chamber C with a sufficient channel area. If the brake pedal is now released under this braking condition, the second valve seat 18 formed on the valve plunger 17 will engage the valve element 20 to interrupt the communication of the variable pressure chambers B and D with the atmosphere while the valve element 20 moves away from the first valve seat 16 to allow the variable pressure chambers B and D to communicate with the constant pressure chambers A and C, respectively, whereby the power pistons 9 and 10 are returned to their original inoperative positions under the resilience of the return spring 33.

Since a communication between the constant pressure passage 23 and the constant pressure chamber C is maintained with a sufficient channel area which is assured by the provision of the plurality of slits 7e, a negative pressure can be rapidly introduced into the constant pressure chamber C as the volume of the constant pressure chamber C increases as a result of a retracting movement of the rear power piston 10, thus preventing any retardation in the returning movement of the rear power piston 10 from occurring.

However, it is to be noted that there is no need to provide sufficient spacing between the rear power piston 10 and the annular seal means 7 when the rear power piston reaches the end of its forward stroke for the purpose of securing a sufficient channel area between the rear power piston 10 and the annular seal means 7, or for the purpose of preventing the opening or the clearance δ defined between the stepped end face 6a of the valve body 6 and the rear power piston 10 from being closed by the annular seal means 7. This means that the axial size of the valve body 6 can be reduced by a corresponding amount.

Figure 3:
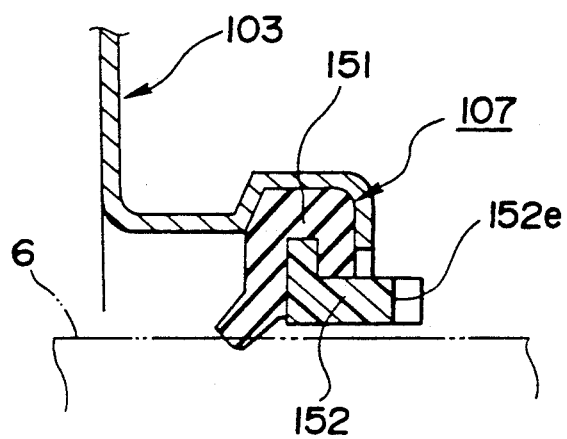
FIG. 3 is a cross section of another embodiment of the invention.

FIG. 3 shows another embodiment of the invention. In this embodiment, a centerplate 103 is provided with annular seal means 107, which comprises an annular seal member 151 formed of rubber and an annular bearing 152 formed of synthetic resin, with a plurality of lists 152e formed in the rear end face of the bearing 152 to provide passages which provide a communication between the inner and the outer periphery of the annular seal means 7. It will be apparent that the same functioning and the effects are achieved as in the previous embodiment.

While the slits 7e and 152e form the passages in the described embodiments, it should be understood that the form of these passages are not limited to slits. In addition, while the distance between the annular seal means 7 and the opening of the variable pressure passage 27 into the variable pressure chamber B is chosen to be comparable to that of a conventional arrangement in the described embodiment, such distance may be reduced and a passage such as a slit may be formed on the front side of the annular seal means 7. In addition, the invention is also applicable where either one of the constant pressure passages 23 providing a communication between the constant pressure chambers A and C or the variable pressure passage 27 providing a communication between the variable pressure chambers B and D is formed on the valve body 6.

While the described embodiments illustrate the application of the invention to a brake booster of a tandem type in which a single centerplate is disposed within a shell, it should be understood that the invention is equally applicable to a brake booster of triple type having a pair of centerplates disposed within a shell.

While the invention has been described in connection with several embodiments thereof, it should be understood that a number of changes, substitutions and modifications will readily occur to one skilled in the art from the above disclosure without departing from the scope and spirit of the invention defined by the appended claims.

What is claimed is:

1. In a tandem type brake booster including a centerplate disposed within a shell to divide its interior into a front and a rear chamber, a valve body slidably extending through the center plate, annular seal means for maintaining a hermetic seal between the centerplate and the valve body, said annular seal means having an inner peripheral surface disposed for slidable sealing engagement with an outer peripheral surface of said valve body, power pistons disposed within each chamber defined by the centerplate and connected to the valve body, diaphragms applied to the back surface of each power piston to divide each chamber into a constant pressure chamber and a variable pressure chamber, a constant pressure passage for providing a communication between the constant pressure chambers, and a variable pressure passage for providing a communication between the variable pressure chambers;

the improvement wherein a passage is formed in the annular seal means and extends therethrough for providing, through said annular seal means, a communication between the inner periphery and the outer periphery thereof.

2. In a tandem type brake booster including a centerplate disposed within a shell to divide its interior into a front and a rear chamber, a valve body slidably extending through the centerplate, annular seal means for maintaining a hermetic seal between the centerplate and the valve body, power pistons disposed within each chamber defined by the centerplate and connected to the valve body, diaphragms applied to the back surface of each power piston to divide each chamber into a constant pressure chamber and a variable pressure chamber, a constant pressure passage for providing a communication between the constant pressure chambers, and a variable pressure passage for providing a communication between the variable pressure chambers;

the improvement wherein a passage is formed in the annular seal means for providing a communication between the inner and the outer periphery thereof, the inner periphery of the centerplate is formed with a cylindrical extension of a given length which extends rearwardly, with the rear end of the cylindrical extension being folded radially inward to define a fold, the annular seal means being mounted around the fold formed on the centerplate, and the passage of the annular seal means being defined by a plurality of slits formed in the rear end face thereof.

3. A brake booster according to claim 2 in which the annular seal means comprises a sealing member formed of rubber comprising a body which is a press fit into the cylindrical portion of the centerplate, an ear extending from the body and abutting against the rear side of the fold, a first seal extending radially inward from the ear and disposed in sliding contact with the outer periphery of the valve body, and a second seal extending radially inward and obliquely forward from the front end of the body and disposed in sliding contact with the outer periphery of the valve body.

4. A brake booster according to claim 2 in which the annular seal means comprises an annular seal member formed of rubber and an annular bearing formed of synthetic resin, the annular seal member being mounted on the front side of the fold of the centerplate while the annular seal member is disposed in sliding contact with the outer periphery of the valve body, the annular bearing being connected to the annular seal member and having the slits formed in the rear end face thereof.

5. In a tandem type brake booster including a centerplate disposed within a shell to divide its interior into a front and a rear chamber, a valve body slidably extending through the centerplate, annular seal means for maintaining a hermetic seal between the centerplate and the valve body, power pistons disposed within each chamber defined by the centerplate and connected to the valve body, diaphragms applied to the back surface of each power piston to divide each chamber into a constant pressure chamber and a variable pressure chamber, a constant pressure passage for providing a communication between the constant pressure chambers, and a variable pressure passage for providing a communication between the variable pressure chambers;

the improvement wherein a passage is formed in the annular seal means for providing a communication between the inner and the outer periphery thereof, said annular seal means being disposed in slidable sealing engagement with an outer peripheral surface of said valve body, at least one of said pressure passages extending through said valve body and opening into said outer periphery surface thereof adjacent one of said power pistons, and said valve body being slidable movable relative to said centerplate and said annular seal means to a position wherein said passage in said annular seal means substantially contiguously adjoins aid one pressure passage to form an extension thereof beyond said outer peripheral surface of said valve body.

6. In a tandem type brake booster including a centerplate disposed within a shell to divide its interior into a front and a rear chamber, a valve body slidably extending through the centerplate, annular seal means for maintaining a hermetic seal between the centerplate and the valve body, power pistons disposed within each chamber defined by the centerplate and connected to the valve body, diaphragms applied to the back surface of each power piston to divide each chamber into a constant pressure chamber and a variable pressure chamber, a constant pressure passage for providing a communication between the constant pressure chambers, and a variable pressure passage for providing a communication between the variable pressure chambers;

the improvement wherein a passage is formed in the annular seal means for providing a communication between the inner and the outer periphery thereof, said passage in said annular seal means being defined by a plurality of slits formed in a rear end face thereof.

7. A brake booster according to claim 1, wherein said inner peripheral surface of said annular seal means has front and rear axial extremities, said inner peripheral surface extending continuously between said axial extremities, said passage opening into said inner peripheral surface at a location axially between said front and rear axial extremities, and said passage being disposed in axially overlapping relationship relative to said inner peripheral surface of said annular seal means.

8. A brake booster according to claim 1, wherein said passage is provided in an end face of said annular seal means.

* * * * *

UNITED STATES PATENT AND TRADEMARK OFFICE
CERTIFICATE OF CORRECTION

PATENT NO. :   5 083 496

DATED      :   January 28, 1992

INVENTOR(S) :  Haruo SUZUKI et al

It is certified that error appears in the above-identified patent and that said Letters Patent is hereby corrected as shown below:

Column 7, line 27; change "periphery" to ---peripheral---.
          line 29; change "slidable" to ---slidably---.
          line 32; change "aid" to ---said---.

Signed and Sealed this

Twenty-seventh Day of April, 1993

*Attest:*

MICHAEL K. KIRK

*Attesting Officer*      *Acting Commissioner of Patents and Trademarks*